United States Patent
Inoue

(10) Patent No.: US 8,400,662 B2
(45) Date of Patent: Mar. 19, 2013

(54) PRINTER CONTROL DEVICE FOR CONTROLLING CONCURRENTLY INPUT PRINT DATA, AND PRINTER APPARATUS WITH A PRINTER CONTROL DEVICE

(75) Inventor: Akira Inoue, Hachioji (JP)

(73) Assignee: Konica Minolta Business Technologies, Tokyo (JP)

( * ) Notice: Subject to any disclaimer, the term of this patent is extended or adjusted under 35 U.S.C. 154(b) by 404 days.

(21) Appl. No.: 12/857,311

(22) Filed: Aug. 16, 2010

(65) Prior Publication Data
US 2010/0309522 A1    Dec. 9, 2010

Related U.S. Application Data

(62) Division of application No. 10/925,584, filed on Aug. 25, 2004, now abandoned.

(30) Foreign Application Priority Data

Dec. 19, 2003   (JP) .................. 2003-421988

(51) Int. Cl.
*G06F 15/00*      (2006.01)
*G06K 1/00*       (2006.01)

(52) U.S. Cl. .................. 358/1.15; 358/1.1; 358/1.16

(58) Field of Classification Search .................. None
See application file for complete search history.

(56) References Cited

U.S. PATENT DOCUMENTS

| | | | |
|---|---|---|---|
| 5,791,790 | A | 8/1998 | Bender et al. |
| 5,894,545 | A | 4/1999 | Fukuta |
| 6,023,343 | A | 2/2000 | Hoang et al. |
| 6,327,044 | B1 | 12/2001 | Shima |
| 6,483,604 | B1 | 11/2002 | Gerstenberger |
| 6,545,766 | B1 | 4/2003 | Shima et al. |

FOREIGN PATENT DOCUMENTS

| | | |
|---|---|---|
| EP | 0 795 817 A1 | 9/1997 |
| JP | 09-216424 A | 8/1997 |
| JP | 9-216424 A | 8/1997 |
| JP | 10-044564 A | 2/1998 |
| JP | 10-067146 A | 3/1998 |
| JP | 10-124267 A | 5/1998 |
| JP | 10-264455 A | 10/1998 |
| JP | 10-289072 A | 10/1998 |
| JP | 11-020242 A | 1/1999 |
| JP | 2000-099291 A | 4/2000 |
| JP | 2000-311071 A | 11/2000 |
| JP | 2002-132475 A | 5/2002 |
| JP | 2002-178608 A | 6/2002 |

OTHER PUBLICATIONS

Japanese Office Action dated Jun. 4, 2009 (and English translation thereof) in counterpart Japanese Application No. 2004-299767.

(Continued)

*Primary Examiner* — Thierry Pham
(74) *Attorney, Agent, or Firm* — Holtz, Holtz, Goodman & Chick, P.C.

(57) ABSTRACT

A printer apparatus is provided which receives concurrent input print data from plural input ports without increasing receiving buffer memory. A controller determines whether an image creator is used by other jobs when starting receiving print data through any one of the plural input ports. When not used, print data related to the current job is stored in a receiving buffer memory and at the same time print data stored in the buffer memory is printed via the image creator. On the other hand, when other jobs use the image creator, the print data related to the current job is stored in a hard disk unit and is printed when the image creating device becomes available.

28 Claims, 4 Drawing Sheets

OTHER PUBLICATIONS

Japanese Office Action dated Jul. 27, 2010 (and English translation thereof) in counterpart Japanese Application No. 2004-299767.

Japanese Office Action dated Jun. 4, 2009, and English translation thereof, issued in counterpart Japanese Application No. 2004-299767.

Japanese Office Action dated Dec. 18, 2008, and English translation thereof, issued in counterpart Japanese Application No. 2004-299767.

Japanese Office Action dated Mar. 12, 2009, and English translation thereof, issued in counterpart Japanese Application No. 2004-299767.

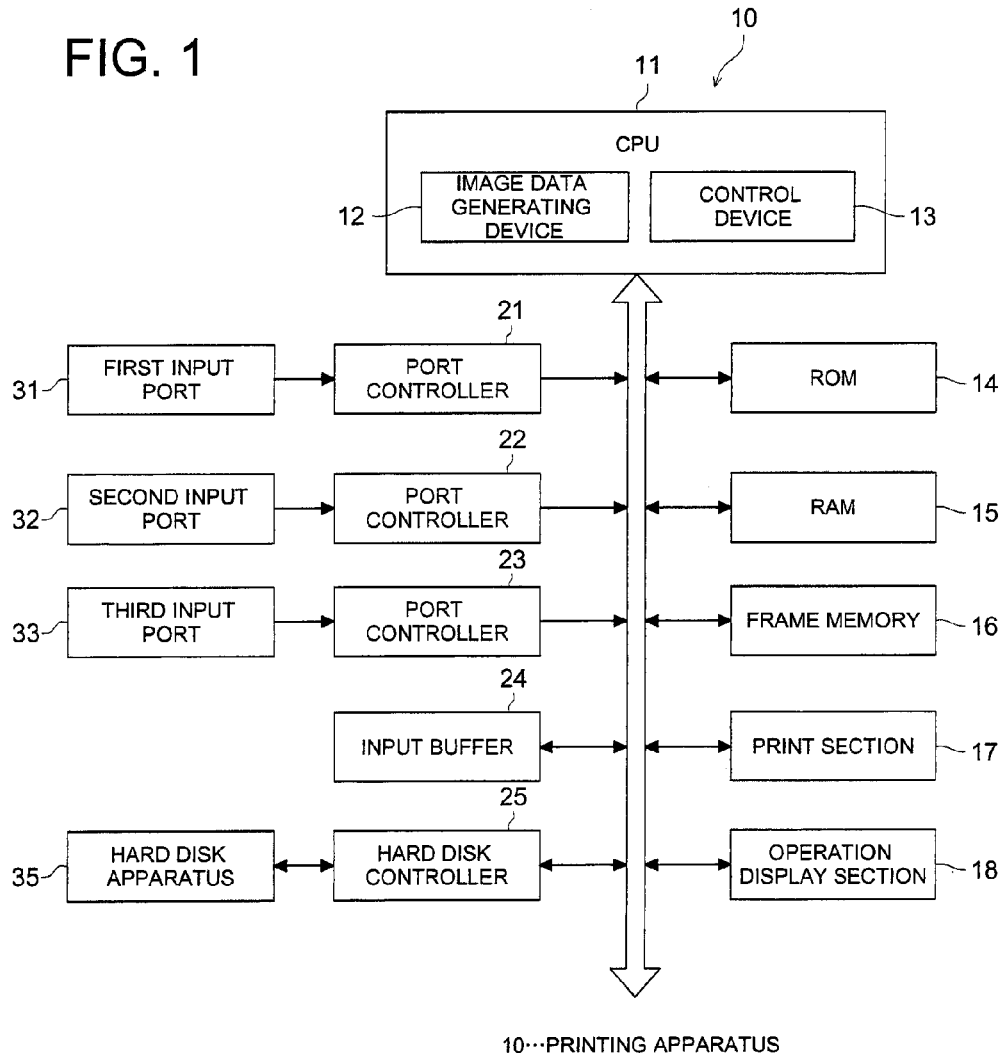

FIG. 6

| OPERATIONAL PATTERN | SPOOLING MODE | NEXT JOB STATUS | | |
|---|---|---|---|---|
| SPOOLING MODE | SPOOLING | SINGLE JOB OPERATION | PRINT AFTER SPOOLING ALL DATA | |
| CONCURRENT RECEIVING PATTERN 1 | SPOOLING | UNDER DATA RECEIVING | PRINT AFTER SPOOLING ALL DATA | HOLDING IMAGE DATA GENERATING UNTIL FINISHING SPOOLING |
| CONCURRENT RECEIVING PATTERN 2 | SPOOLING | FINISHED DATA RECEIVING | START IMAGE DATA GENERATING PROCESS IMMEDIATELY AFTER READING OUT SPOOLED DATA | |
| CONCURRENT RECEIVING PATTERN 3 | AUTOMATIC | WAITING FOR INPUT DATA | START IMAGE DATA GENERATING PROCESS WITHOUT SPOOLING | |
| CONCURRENT RECEIVING PATTERN 4 | AUTOMATIC | UNDER DATA RECEIVING | CONCURRENT OPERATIONS OF READ/WRITE FROM/TO SPOOLING DESTINATION | READING DOES NOT SURPASS WRITING AND FINISHING DATA RECEIVING |
| CONCURRENT RECEIVING PATTERN 5 | AUTOMATIC | UNDER DATA RECEIVING | CONCURRENT OPERATIONS OF READ/WRITE FROM/TO SPOOLING DESTINATION | NON-SPOOLING AFTER READING SURPASSES WRITING |
| CONCURRENT RECEIVING PATTERN 6 | AUTOMATIC | FINISHED DATA RECEIVING | START IMAGE DATA GENERATING PROCESS IMMEDIATELY AFTER READING OUT SPOOLED DATA | |

70

PRINTER CONTROL DEVICE FOR CONTROLLING CONCURRENTLY INPUT PRINT DATA, AND PRINTER APPARATUS WITH A PRINTER CONTROL DEVICE

The present application is a Divisional Application of U.S. application Ser. No. 10/925,584, filed Aug. 25, 2004, now abandoned which is based upon and claims benefit of priority from Japanese Application No. JP 2003-421988, filed Dec. 19, 2003, the entire contents of both of which are incorporated herein by reference.

BACKGROUND OF THE INVENTION

The present invention relates to a printer control device and a printer apparatus equipped with a printer control device to receive print data from external device and create the print data into image data, specifically apparatuses having plural input ports for print data.

In the recent years, printer apparatuses have had plural input ports such as parallel interfaces, USB (Universal Serial Bus) and LAN (Local Area Network) to conform wide variety of interfacing methods.

Even though plural input ports are provided in the apparatus as explained above, there are cases when a bottle neck occurs such as when processes in the printer cannot handle the plural concurrent input data from the plural input ports, an external device from which the print data are issued, cannot send a print data for a long time.

Consequently, a printer apparatus capable of handling concurrent input data from plural input ports featuring a receiving data processing section, a receiving buffer memory and an image creator to analyze and transform receiving data into image data, is proposed for the each input port. (Refer to patent reference No. 1)

[Patent Reference No. 1]
Japanese Patent Application Publication No. HEU 11-20242.

It becomes a cost factor to provide the buffer memory and the image creator for each input port, since a configuration of the printer apparatus becomes a major unit. Even though the receiving buffer memory is provided for each input port, in the case of complicated print data, which require more time to be created into image data, and as it continues then the receiving buffer memory eventually reaches its capacity and the receiving function is interrupted due to such a bottleneck. In order to prevent the printer apparatus from reaching the bottleneck, it was necessary to increase memory capacity of the receiving buffer memory. Further, there was a problem that the cost of the printer apparatus eventually rises when the receiving buffer memory is comprised of high-speed access semiconductor memories.

SUMMARY OF THE INVENTION

The purpose of this invention is to provide a printer apparatus, which can handle concurrent input data from plural input ports without increasing the amount of the receiving buffer memory and image creating section.

The objective stated above will be attained by the following embodiments.

(Item 1) A printer control device comprising:
plural input ports (31-33) to receive print data from the external devices;
a receiving buffer (24) used by the first port and the second port to temporarily store the print data;
a storage (35) used by the first port and the second port, to store the print data received by the first port and the second port;
an image creator (12) to create an image data based on the print data from the external device; and
a controller (13) to judge whether the image creator (12) is creating the image data based on a previously received print data, when any one of the input ports receives a new print data from the external device, the controller (13) stores the new print data in the receiving buffer (24) when the image creator (12) is not creating the image data, and stores the new print data in the storage (35) in case the image creator (12) is creating the image data. And later, the image creator (12) consequently creates image data.

According to the embodiment above, when staring to receive print data related to a new job in any one of input ports, if the image creator is not in use by another job then receiving buffer memory (24) stores the print data related to the new job and the image creator (12) immediately creates image data from the print data. When image creator (12) is in use with another job, instead of receiving buffer memory (24), storage (35) store the print data, and after that the stored data are read from storage (35) and image creator (12) creates image data from the print data.

One set of receiving buffer memory (24) and image creator (12) is enough. However, it also may be possible to provide plural sets of receiving buffer memory (24) and image creator (12) under the condition that the number of the set is less than the number of input port.

"Image creator (12) is in use" means that other than image creator (12) executes image creation activities, the situation that print data exit and wait for image creation via image creator (12) may be included, taking account that there are some intervals between jobs.

(Item 2) The printer control device of embodiment (Item 1) above, wherein when the image creator completes creating the image data based on the print data, the controller judges whether another print data is stored in the storage (35), and controls the image creator (12) to create the image data based on the stored data in case the another print data is stored in the storage (35).

According to embodiment (Item 2) above, while print data exit in storage (35), the print data is processed prior to print data received in input ports. Accordingly, when new print data related to a new job is received while print data exit in storage (35), the new print data is stored in storage (35) since image creator (12) is in use.

(Item 3) The printer control device of embodiment (Item 1) or (Item 2) having control method to change the flow of a printing job, the control method comprising:
storing print data inputted to input ports in receiving buffer memory (24);
sequentially creating image data of the print data stored in receiving buffer memory (24) in image creator (12) as concurrently storing the print data in the receiving buffer memory, when a process to create image data from print data stored in storage (35) catches up to a process to store print data received in an input port to storage (35), the print data belongs to the same job as that of the image data.

According to the embodiment above, when print data inputted from an input port is stored in storage (35), an image creating process catches up with an input process, while reading out print data from storage (35), which belongs to the same job, and creating image data from the print data, the target storage device is changed from storage (35) to receiving buffer (24).

(Item 4) The printer control device of embodiment (Item 1) (Item 2) or (Item 3), wherein storage (35) is a hard disk drive.
(Item 5) Printer apparatus (10) including printer control device of any one of embodiments (Item 1)-(Item 4).

According to the printer control device and the printer apparatus having the printer control device related to the embodiments above, when an image creator is used with other job, print data related to a new job can be received since the storage is assigned as a target storage device for the print data. Accordingly, it becomes possible to realize a concurrent receiver from plural input ports without increasing the number of receiving buffer, image creator, a bottle neck and/or time-out. Also it becomes possible to realize to concurrently receive print data from plural input ports while keeping cost of the apparatus low since it is not necessary to provide a receiving buffer and an image creator for each input port.

When completing the creation of image data from print data related to a job, a judgment is conducted whether print data exist in a storage waiting for the image creation. And when existing, the image creator creates image data from the print data. Accordingly, job interval becomes shorter and throughput will be improved.

In the case of that as storing print data inputted from an input port in a storage device, an image creating process catches up with input process, while reading out print from the storage and creating image data from the print data, the target storage device is changed from the storage device to a receiving buffer, the load of a processing will be decreased comparing with the load of a processing when the printing process is continued via the storage device. Even when print data related to a new job from another input port occurs, access concentration to a storage device is relieved since the job whose print data are processed into image data uses the receiving buffer.

When using a hard disk drive as a storage, it becomes possible to provide large amount of memory area with low cost.

BRIEF DESCRIPTION OF THE DRAWING

FIG. 1 shows a configuration of a printer apparatus of an embodiment of this invention.

FIG. 2 shows relationship between operational modes of an embodiment of this invention, the status of previous jobs and whether spooling is necessary.

FIG. 6 is a table showing execution status of printing operations under a variety of conditions in the embodiment of the present invention.

DETAILED DESCRIPTION OF THE INVENTION

Figure 3:
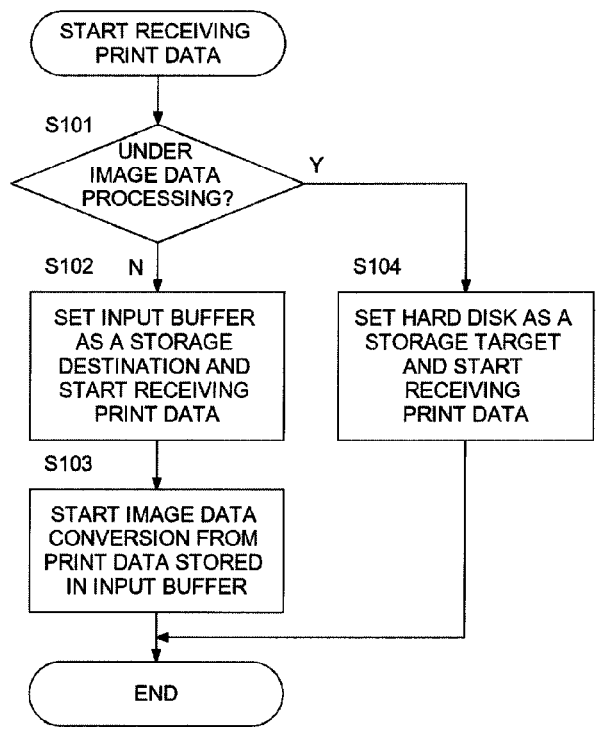
FIG. 3 is a flow chart showing the process of initiation of receiving print data of a new job in an embodiment of this invention.

The examples of the present invention will be explained as follows by using drawings.

Printer apparatus 10 having a functions to receive print data from external various apparatus such as personal computers and print images corresponding to print data onto paper recording sheets. Printer apparatus 10 is designed to have plural input ports to input print data from external devices and printing data can be concurrently entered through input ports 31-33.

Printer apparatus 10 features CPU (Central Processing Unit) 11 to control operations thereof. CPU 11 functions as creating device 12 to transform print data to image data and as controller 13 to control the printing process flow from the input of the print data through the creation of image data.

Data bus of CPU 11 connects to ROM (Read Only Memory) 14, RAM (Random Access Memory) 15, frame memory 16, printing section 17, operation and display section 18, ports controllers 21, 22 and 23, receiving buffer 24 and hard disk controller 25.

First input port 31 is connected to first port controller 21, second input port 32 is connected to second port controller 22 and third input port 33 is connected to third port controller 23 respectively. Hard disk drive 35 is connected to hard disk controller 25 as a sub storage apparatus.

ROM 11 memorizes programs executed by CPU 11 and a variety of fixed data. RAM 15 is a rewritable memory and temporarily memorizes necessary data for CPU 11 to execute the programs. Frame memory 16 is to memorize image data, which image creator 12 creates. The capacity of frame memory 16 is arranged to store at least one page of image data printed on a paper recording sheet.

Print section 17 is a printer engine to read out image data stored in frame memory 16 and to form images onto paper recording sheets. Print section 17 is comprised of a conveyance unit for the paper recording sheets, a photo-sensitive material drum, an electrostatic charger, a laser unit, a developing apparatus, an image transferring and separating apparatus, a cleaning apparatus and a fixing apparatus, and whereby it is so to speak a laser method printer engine.

Operation and display section 18 is composed of a liquid crystal display and a variety of operation switches and functions to display instructions and status of the various operations or to accept user input for the operations.

First port controller 21 functions to communicate with external device through input port 31. Similarly, second port controller 22 functions to communicate with external device through second input port 32 and third controller 23 functions to communicate with external device through third input port 33. In this case, first input port 31 is a port to connect printer apparatus 10 to a network such as a LAN etc., second input port 32 is used as a USB port and third input port 33 is used as a parallel port. As long as there are plural input ports, obviously the number of ports and the classification are not limited to one shown in FIG. 1.

Receiving buffer memory 24 is designed to temporarily store print data input through input ports 31-33. In this case, high-speed access semiconductor memory devices are used in the receiving buffer memory 24. Obviously capacity of receiving buffer memory 24 can be set appropriately. Capacity of a hard disk unit is far greater than that of receiving buffer 24.

Subsequently, printer apparatus 10 will be explained. As operational modes, printer apparatus 10 has a spooling mode, a non-spooling mode and an automatic mode when used in receiving print data and executing a printing. Operator can arbitrarily set and modify these spooling modes by operation display section 18 or through a network.

A spooling mode is an operational mode (the first receiving mode) to transform spooled print data into image data after temporarily storing all print data, which have been input, into hard disk unit 35. In regard to the start timing to read the spooled data, it may be at any time if it is after the completion of storing operations or even before completion of the receiving data of the job storing operation in hard disk drive 35. A non-spooling mode is an operational mode (the second receiving mode) to successively create input print data into image data without spooling. An automatic mode is an operational mode to determine automatically whether the input print data should be spooled based upon existing situation.

During the automatic mode, a judgment whether input print data should be stored (spooled) into hard disk unit 35 is determined based upon the situation whether image creator 12 is engaged in other jobs. Receiving processes proceeded in parallel are known as concurrent reception.

FIG. 2 is spooling condition chart 50 showing the relationship between the set spooling mode, status of previous jobs and designation of spooled operations. In a spooling mode, the input print data is forced to be spooled in spite of the situation whether image creation of the previous jobs have been finished or not. In a non-spooling mode, the input print data is not forced to be spooled in spite of the situation that image creation of the previous job has been finished or not. In the automatic mode, the input print data is forced to be spooled when previous job has not been completed and are not forced to be spooled when the previous job has been completed. Further, printer apparatus 1 executes processes of image creation of a job in the order of input and to print them onto paper recoding sheets.

FIG. 3 is a flow chart showing the process of initiation of receiving print data of a new job in the automatic mode. When starting of receiving print data of a new job via input ports 31-33 or port controllers 21-23, controller 13 of printer apparatus 10 checks whether image creator 12 is in use. If it is not in use (Step S101; N), then (Step S102) starts receiving print data after assigning receiving buffer 24 as a storage destination of print data of the new job. Also, (Step S103) instructs image creator 12 to start image creation process of image data stored in receiving buffer 24.

In situations when image creator 12 is being used include the situation that a job is waiting for the image creation process, taking account of job intervals between job changes.

When receiving a new print job while other jobs are using image creator 12, step S101; Y assigns hard disk unit 35 as a storage destination of the print data related to the new job and starts receiving the print data since the print data related to the new job can not be created immediately. (step S104)

Even when a job in the receiving mode cannot use image creator 12, it is possible to receive print data simultaneously while processing image creation of other jobs since print data under the receiving status are stored in hard disk unit 35 and no bottleneck occurs in the apparatus from which print data is being sent.

When a job, which is using image creator 12, uses any one of the input ports, a new job can be inputted from another input port. There is a possibility that when the job using image creator 12 has already finished to receive print data, the same input port can be used for receiving new print data related to the new job. In the case of the automatic mode, the storage destination for print data related to the new job is determined based on the situation whether image creator 12 is free.

Figure 4:
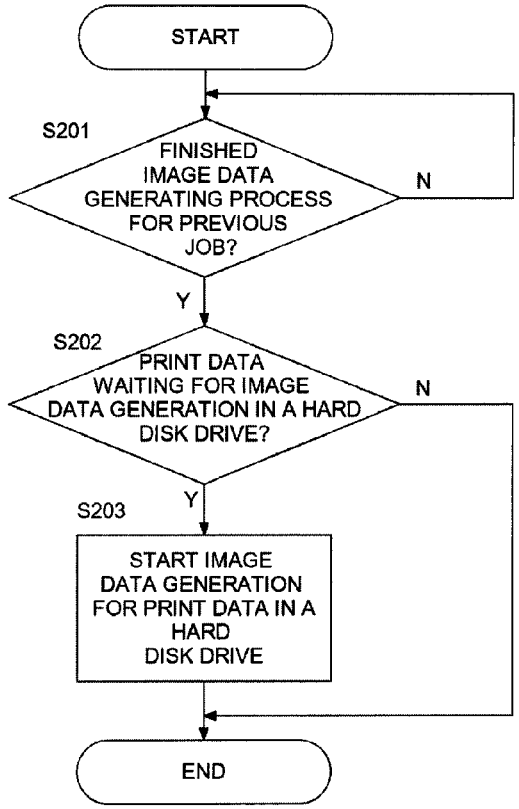
FIG. 4 is a flow chart showing a process when completing the image creation related to a job in the printer apparatus of the embodiment of the present invention.

FIG. 4 shows a flow chart when an image creation process has been completed. The latest job, of which image creation process has been completed, is called a previous job and the subsequent job is then called the next job, in the following paragraph. Upon completion of image creation of a previous job (step S201; Y) whether print data waiting for the image creation process resides in hard disk unit 35 is checked. When any print data resides (step S202; Y), then direct image creator 12 to start processing of image creation of print data related to the input job, which has been input first among the jobs waiting for image creation process, and then completes the process (step S203).

When creating the print data stored in hard disk drive 35 into image data in image creator 12, the print data read from hard disk drive 35 is temporarily stored in buffer memory 24 before the image data creation. Instead of receiving buffer 24, another buffer, which is dedicated to an image creation process, can be provided.

When no print data waiting for the image creation resides in hard disk unit 35 (step S202; N), the finishing process continues. Image creator 12 enters in a waiting status when no job is residing in it.

In case that a next job resides in the hard disk when completing image creation process of a previous job, throughput can be improved since the image creation process of the next job starts immediately and consequently the interval between jobs becomes negligible.

When print data received via ports 31-33 are arranged to be stored in hard disk drive 35, print data, which have been stored in hard disk drive 35, also can be read and created into image data via image creator 12 before the print data of the job have not been fully stored in hard disk drive 35.

Explained next will be the operation of controller 13, when the image creation process surpasses the input process, namely, in regard to the print data of receiving job, no more print data resides in hard disk drive 35, while executing the input process that is receiving print data and stores it into hard disk unit 35, and creating the print data, which have been read out from hard disk unit 35, into image data. In this case, the printing process continues by switching the storage destination from hard disk unit 35 to receiving buffer memory 24 since it is not necessary to use hard disk unit 35.

Figure 5:
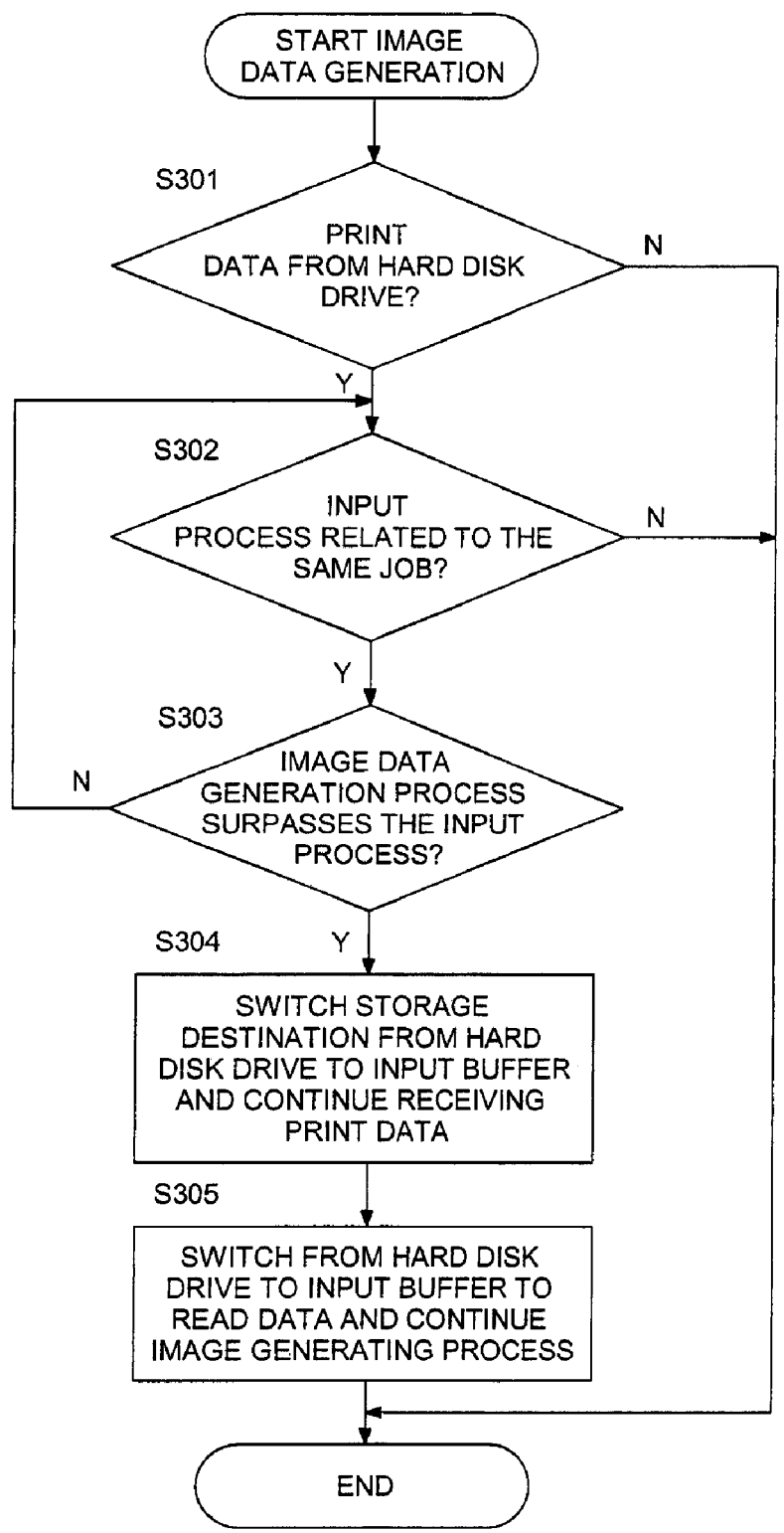
FIG. 5 is a flow chart showing the switching process used in a printer apparatus of this invention.

FIG. 5 shows the switching process of the operation explained above. When starting image creation, check whether the print data is read from hard disk unit 35 in the current image creation. When reading from hard disk unit 35 (step S301; N), and then stop the switching process by keeping the status as it has been. When reading print data from hard disk unit 35 (step S301; Y), check whether the job, to which the print data relates, is in an input process. When the input process has been completed (step S302; Y) then stop the switching process.

When executing the input process of print data related to the same job (step S302; Y), then check whether the creating process is surpassing the input process. If it is not surpassing the input process (step S303; N) then go back to step S302. Namely, the input process is completed before the creating process surpasses the input process (step S302; N), then stop the switching process since it is not necessary to switch the storage destination.

If the creating process is surpassed the input process (step S303; Y), then switches the storage destination from hard disk unit 35 to receiving buffer memory 24 and (step S304) continues receiving the print data. The switch from the hard disk drive to the input buffer to read data is performed and the image generating process continues (step S305). Thereby, processing load of CPU 11 and number of access to hard disk unit 35 can be decreased and even though a receiving process of print data of other jobs is required, this job can be smoothly handled simultaneously since the input process can be processed without going through hard disk unit 35.

Further, in the examples shown in FIGS. 4 and 5, it is possible to start reading print data from hard disk drive 35 based on the results of determination whether receiving buffer 24 can be used for temporarily storing print data, when starting image creation. Also it is possible to start reading print data from hard disk drive 35 based on the results of determination whether frame memory 16, which stores image data generated via image creator 12, can be used for temporarily storing image data print data.

FIG. 6 is table 70, showing execution status of printing operations under a variety of conditions, which include operations shown in FIGS. 4 and 5 above. During "spooling mode" is "spooling" and single job operation, (operation pattern is in the spooling mode) all print data is spooled and created into image data and then printed.

When the "spooling mode" is "spooling" and "next job status" is "receiving print data" (in the case of "concurrent receiving pattern 1") all data is spooled and created into image data. Then the image data are printed.

When the "spooling mode" is "spooling" and "next job status" is "completion of receiving print data" (in the case of "concurrent receiving pattern 2) start image creation immediately by reading out print data, which have been spooled since spooling of all print data has been completed.

When the "spooling mode" is "automatic" and "next job status" is "waiting for print data" (in the case of concurrent receiving pattern 3) then buffer the print data into buffering memory device 24 and start image creation by immediately reading out the print data from receiving buffer memory 24 since image creating device 12 is not in use.

When the "spooling mode" is "automatic" and "next job status" is "receiving print data", simultaneously execute the spooling operation of the print data and image creation by reading out the print data from a spooling destination. In such a situation, there are two cases. The first case is that the image creation process is not surpassing input processing (in the case of concurrent receiving pattern 4) and the second case is that an image creation surpasses input process (in the case of concurrent receiving pattern 5). If not surpassed input processing, the spooling destination has been hard disk unit 35 and the same situation is going on and if surpassed input processing, the spooling destination is switched to receiving buffer memory 24.

When the "spooling mode" is "automatic" and "next job status" of receiving print data has been completed (in the case of concurrent receiving pattern 6) immediately start reading out print data from the spooling destination and initiate creation into image data.

In the above example, when the spooling mode is set in automatic mode, control section 13 determines whether receiving print data is received in spooling mode (the first receiving mode) or non-spooling mode (the second receiving mode) based on a judgment result whether image creator 12 is in the process of image data creation. However the present invention is not limited to this embodiment. Namely, it is also possible to determine whether receiving print data is received in spooling mode (the first receiving mode) or non-spooling mode (the second receiving mode) based on a judgment result whether receiving buffer, which temporarily stores print data in the first half of image data creation, can store the print data.

Further, as another example, it is also possible to determine whether receiving print data is received in spooling mode (the first receiving mode) or non-spooling mode (the second receiving mode) based on a judgment result whether frame memory 16, which temporarily stores image data generated via image data creation, can store the print data.

Although one preferred embodiment in accordance with this invention has first been described in detail, those skilled in the art will recognize that various substitutions and modifications may be made to the apparatus without departing from the scope and spirit of the invention, as cited in the appended claims. For example, in the embodiment described above, printer 10 (being a printer control device) has been shown that it is possible to configure printer control device (being a printer control device) by removing the printer engine portion and appropriately integrate the printer control device with other printer engines. Further, it is possible to combine a copy function for manuscripts and a facsimile function, and thereby configure a multi-functional apparatus.

What is claimed is:

1. A printer control device comprising:
    a first port and a second port, each of which receives a print data from an external device;
    a receiving buffer used by the first port and the second port to temporarily store the print data;
    a storage used by the first port and the second port to store the print data received by the first port and the second port;
    an image creator which creates image data based on the print data from the external device; and
    a controller which judges whether the image creator is creating the image data based on previously received print data, when the first port or the second port receives new print data from the external device;
    wherein the controller controls storing of the new print data in the receiving buffer when the image creator is not creating the image data, and stores the new print data in the storage when the image creator is creating the image data;
    wherein the controller controls the image creator to create the image data based on the print data stored in the storage;
    wherein before the image creator completes creating the image data based on the print data, the controller judges whether another print data is stored in the storage, and controls the image creator to create the image data based on the stored data in case the another print data is stored in the storage; and
    wherein, while the controller stores the print data received by the first port or the second port in the storage, the controller starts reading out the print data stored in the storage and the image creator starts creating the image data based on the print data before the completion of storing the print data in the storage.

2. The printer control device according to claim 1, wherein, when the controller stores the print data received by the first port or the second port in the storage and the image creator creates the image data based on the print data stored in the storage, the controller stores the print data received by the first port or the second port in the receiving buffer when the print data to be read out from the storage for the image data creation does not exist.

3. The printer control device according to claim 1, wherein the controller judges whether the print data stored in the storage can be stored in the receiving buffer, before the controller reads out the print data stored in the storage and the image creator creates the image data based on the print data, and when possible, the controller stores the print data in the receiving buffer, and then creates the image data based on the print data.

4. The printer control device according to claim 1, further comprising:
    a memory which temporarily stores the image data created by the image creator;
    wherein the controller judges whether the memory can store the image data created by the image creator before the controller reads out the print data stored in the storage and when possible, the image creator creates the image data based on the print data, and the controller stores the image data in the memory.

5. A printer control device comprising:
a first port and a second port, each of which receives a print data from an external device;
a receiving buffer used by the first port and the second port to temporarily store the print data;
a storage used by the first port and the second port, to store the print data received by the first port and second port;
an image creator which creates an image data based on the print data received from the external device; and
a controller which judges whether the receiving buffer can store the new print data;
wherein the controller controls to store the new print data in the receiving buffer when the receiving buffer can store the new print data, and the controller stores the new print data in the storage when the receiving buffer cannot store the new print data;
wherein the controller controls the image creator to create the image data based on the print data stored in the storage;
wherein, before the image creator completes creating the image data based on the print data, the controller judges whether another print data is stored in the storage, and controls the image creator to create the image data based on the stored data in case the another print data is stored in the storage; and
wherein, while the controller stores the print data received by the first port or the second port in the storage, the controller starts reading out the print data stored in the storage and the image creator starts creating the image data based on the print data before the completion of storing the print data in the storage.

6. The printer control device according to claim 5, wherein when the controller stores the print data received by the first port or the second port in the storage and the image creator creates the image data based on the print data stored in the storage, the controller stores the print data received by the first port or the second port in the receiving buffer when the print data to be read out from the storage for the image data creation does not exist.

7. The printer control device according to claim 5, wherein the controller judges whether the print data stored in the storage can be stored in the receiving buffer, before the controller reads out the print data stored in the storage and the image creator creates the image data based on the print data, and when possible, the controller stores the print data in the receiving buffer, and then creates the image data based on the print data.

8. The printer control device according to claim 5, further comprising:
a memory to temporarily store the image data created by the image creator;
wherein the controller judges whether the memory can store the image data created by the image creator before the controller reads out the print data stored in the storage and when possible, the image creator creates the image data based on the print data, and the controller controls storing of the image data in the memory.

9. A printer control device comprising:
a first port and a second port, each of which receives a print data from an external device;
a receiving buffer used by the first port and the second port to temporarily store the print port;
a storage used by the first port and the second port, to store the print data received by the first port and the second port;
an image creator which creates an image data based on the print data received from the external device;
a memory which temporarily stores the image data created by the image creator; and
a controller which judges whether the memory can store the image data in the memory, when the first port or the second port receives a new print data from the external device;
wherein the controller controls the new print data to be temporarily stored in the receiving buffer when the memory can store the image data, and the storage stores the image data when the memory cannot store the image data;
wherein the controller controls the image creator to create the image data based on the print data stored in the storage;
wherein before the image creator completes creating the image data based on the print data, the controller judges whether another print data is stored in the storage, and controls the image creator to create the image data based on the stored data in case the another print data is stored in the storage; and
wherein, while the controller stores the print data received by the first port or the second port in the storage, the controller starts reading out the print data stored in the storage and the image creator starts creating the image data based on the print data before the completion of storing the print data in the storage.

10. The printer control device according to claim 9, wherein when the controller stores the print data received by the first port or the second port in the storage and the image creator creates the image data based on the print data stored in the storage, the controller stores the print data received by the first port or the second port in the receiving buffer when the print data to be read out from the storage for the image data creation does not exist.

11. The printer control device according to claim 9, wherein the controller judges whether the print data stored in the storage can be stored in the receiving buffer, before the controller reads out the print data stored in the storage and the image creator creates the image data based on the print data, and when possible, the controller stores the print data in the receiving buffer, and then creates the image data based on the print data.

12. The printer control device according to claim 9, further comprising:
a memory which temporarily stores the image data created by the image creator;
wherein the controller judges whether the memory can store the image data created by the image creator before the controller reads out the print data stored in the storage and when possible, the image creator creates the image data based on the print data, and the controller stores the image data in the memory.

13. A printer control device comprising:
a first port and second port, each of which receives a print data from an external device;
a receiving buffer used by the first port and the second port to temporarily store the print data from an external device;
a storage used by the first port and the second port, to store the print data received by the first port and the second port;
an image creator to create an image data based on the print data from the external device; and a controller which selects a first mode or a second mode when the first port or the second port receives a new print data from the external device;

wherein the first mode comprises storing the new print data in the receiving buffer and the second mode comprises storing the new print data in the storage;

wherein the controller controls the image creator to create the image data based on the print data stored in the storage;

wherein before the image creator completes creating the image data based on the print data, the controller judges whether another print data is stored in the storage, and controls the image creator to create the image data based on the stored data in case the another print data is stored in the storage; and wherein, while the controller stores the print data received by the first port or the second port in the storage, the controller starts reading out the print data stored in the storage and the image creator starts creating the image data based on the print data before the completion of storing the print data in the storage.

14. The printer control device according to claim 13, wherein when the controller stores the print data received by the first port or the second port in the storage and the image creator creates the image data based on the print data stored in the storage, the controller stores the print data received by the first port or the second port in the receiving buffer when the print data to be read out from the storage for the image data creation does not exist.

15. The printer control device according to claim 13, wherein the controller judges whether the print data stored in the storage can be stored in the receiving buffer, before the controller reads out the print data stored in the storage and the image creator creates the image data based on the print data, and when possible, the controller stores the print data in the receiving buffer, and then creates the image data based on the print data.

16. The printer control device according to claim 13, further comprising:

a memory which temporarily stores the image data created by the image creator;

wherein the controller judges whether the memory can store the image data created by the image creator before the controller reads out the print data stored in the storage and when possible, the image creator creates the image data based on the print data, and the controller stores the image data in the memory.

17. A printer having the printer control device of claim 1.
18. A printer having the printer control device of claim 5.
19. A printer having the printer control device of claim 9.
20. A printer having the printer control device of claim 13.
21. The printer control device according to claim 1, wherein the receiving buffer comprises semiconductor memory.
22. The printer control device according to claim 5, wherein the receiving buffer comprises semiconductor memory.
23. The printer control device according to claim 9, wherein the receiving buffer comprises semiconductor memory.
24. The printer control device according to claim 13, wherein the receiving buffer comprises semiconductor memory.
25. The printer control device according to claim 1, wherein the storage comprises a hard disk drive.
26. The printer control device according to claim 5, wherein the storage comprises a hard disk drive.
27. The printer control device according to claim 9, wherein the storage comprises a hard disk drive.
28. The printer control device according to claim 13, wherein the storage comprises a hard disk drive.

* * * * *